United States Patent
Schneider et al.

(10) Patent No.: US 8,182,909 B2
(45) Date of Patent: May 22, 2012

(54) ENERGY ABSORBING PADDING FOR SPORTS APPLICATION

(75) Inventors: Marc S. Schneider, Fort Meyers, FL (US); William Wurdack, St. Louis, MO (US)

(73) Assignee: Walter Wurdack, Inc., St. Louis, MO (US)

( * ) Notice: Subject to any disclaimer, the term of this patent is extended or adjusted under 35 U.S.C. 154(b) by 0 days.

(21) Appl. No.: 11/791,111

(22) PCT Filed: Nov. 15, 2005

(86) PCT No.: PCT/US2005/041323
§ 371 (c)(1),
(2), (4) Date: Jul. 3, 2007

(87) PCT Pub. No.: WO2006/057858
PCT Pub. Date: Jun. 1, 2006

(65) Prior Publication Data
US 2008/0009556 A1    Jan. 10, 2008

Related U.S. Application Data

(60) Provisional application No. 60/629,580, filed on Nov. 22, 2004.

(51) Int. Cl.
- *B32B 5/20* (2006.01)
- *A42B 3/00* (2006.01)
- *A63B 71/10* (2006.01)
- *C01B 25/00* (2006.01)
- *C08G 18/00* (2006.01)

(52) U.S. Cl. ........ 428/318.8; 2/411; 2/425; 106/287.26; 521/172; 521/173

(58) Field of Classification Search ............... 428/318.8; 521/172, 173; 106/287.26; 2/411, 425
See application file for complete search history.

(56) References Cited

U.S. PATENT DOCUMENTS

| | | | |
|---|---|---|---|
| 3,462,763 A | 8/1969 | Schneider et al. | |
| 3,946,441 A | 3/1976 | Johnson | |
| 4,101,983 A | 7/1978 | Dera et al. | |
| 4,182,649 A * | 1/1980 | Isgur et al. | 162/101 |
| 4,452,829 A | 6/1984 | Smith | |

(Continued)

FOREIGN PATENT DOCUMENTS

GB    2 416 733 A    2/2006

(Continued)

OTHER PUBLICATIONS

Dodge, J. (2003) Polyurethanes and Polyureas, in Synthetic Methods in Step-Growth Polymers (eds M. E. Rogers and T. E. Long), John Wiley & Sons, Inc., Hoboken, NJ, USA.*

*Primary Examiner* — Liam Heincer
(74) *Attorney, Agent, or Firm* — Thompson Coburn LLP (57) ABSTRACT

A method of producing a viscoelastic polyurethane foam coating in which a polyisocyanate is reacted with a polyol to form a prepolymer. The prepolymer is reacted with a polyol having at least one pendant carboxylic acid group to form a prepolymer with a pendant carboxylic acid group. The prepolymer with a pendant carboxylic acid group is neutralized with a tertiary amine and then reacted with water or an organic or inorganic polyamine. An energy absorbing unit in which the coating produced by the above method is provided on a viscoelastic polyurethane foam layer.

12 Claims, 6 Drawing Sheets

U.S. PATENT DOCUMENTS

| | | | |
|---|---|---|---|
| 4,681,808 | A | 7/1987 | Lefler, III |
| 4,801,644 | A * | 1/1989 | Coogan ............................ 524/839 |
| 4,926,503 | A | 5/1990 | Wingo, Jr. |
| 5,021,290 | A | 6/1991 | Rowell |
| 5,147,725 | A | 9/1992 | Pinchuk |
| 5,763,012 | A | 6/1998 | Zhao et al. |
| 5,790,988 | A | 8/1998 | Guadagnino, Jr. et al. |
| 5,881,395 | A | 3/1999 | Donzis |
| 5,946,734 | A | 9/1999 | Vogan |
| 6,025,067 | A | 2/2000 | Fay |
| 6,070,271 | A | 6/2000 | Williams |
| 6,265,028 | B1 | 7/2001 | Zhao et al. |
| 6,298,497 | B1 | 10/2001 | Chartrand |
| 6,385,780 | B1 | 5/2002 | Racine |
| 6,406,780 | B1 | 6/2002 | Sutherland |
| 6,425,141 | B1 | 7/2002 | Ewing et al. |
| 6,428,895 | B1 | 8/2002 | Reihs et al. |
| 6,433,033 | B1 | 8/2002 | Isobe et al. |
| 6,446,270 | B1 | 9/2002 | Durr |
| 6,453,476 | B1 * | 9/2002 | Moore, III ............................ 2/412 |
| 6,461,732 | B1 | 10/2002 | Wittmann et al. |
| 6,467,099 | B2 | 10/2002 | Dennis et al. |
| 6,604,246 | B1 | 8/2003 | Obreja |
| 6,671,889 | B2 | 1/2004 | Dennis et al. |
| 6,704,943 | B2 | 3/2004 | Calonge Clavell |
| 2002/0094430 | A1 | 7/2002 | Baruch |
| 2003/0200597 | A1 * | 10/2003 | Dennis et al. ............................ 2/410 |
| 2004/0126558 | A1 | 7/2004 | Williams et al. |
| 2004/0154080 | A1 | 8/2004 | Abelman et al. |
| 2006/0112477 | A1 | 6/2006 | Schneider |

FOREIGN PATENT DOCUMENTS

| | | |
|---|---|---|
| WO | 02/26069 A2 | 4/2002 |
| WO | 02/077052 A2 | 10/2002 |

* cited by examiner

ENERGY ABSORBING PADDING FOR SPORTS APPLICATION

CROSS-REFERENCE TO RELATED APPLICATIONS

This application claims the benefit of the provisional application, U.S. application Ser. No. 60/629,580, filed Nov. 22, 2004, which is incorporated herein by reference.

BACKGROUND OF THE INVENTION

The present invention is directed to an energy absorbing device comprising slow recovery viscoelastic polyurethane foam with a surface impregnation of material for preventing the absorption of moisture.

Head injuries are a leading cause of death and disability in the United States. Data collected by the Centers for Disease Control demonstrate that, on average, three hundred thousand sports-related brain concussions occur in the United States each year. Children under the age of fourteen have a greater risk for concussions than do adults. Teenagers that suffered two or more "big hits" to the head can suffer long-term damage to their thinking abilities. Twenty percent of teenagers that have suffered multiple concussions have continuous headaches and suffer sleep and concentration disorders. The damage from concussions can vary from mild, which is completely reversible, to severe which can lead to coma or death.

A concussion is an injury to the brain cells resulting from trauma to the head. Loss of consciousness is not necessary for a head injury to be considered a concussion. Concussions are graded in severity on a scale of Grade One (mild) to Grade Three (severe). Concussions are considered to be Grade One when there is no loss of consciousness and symptoms last less than fifteen minutes. A Grade Two concussion is when there is no loss of consciousness, with symptoms lasting longer than fifteen minutes. A Grade Three concussion is when there is any loss of consciousness.

Though the incidence of concussions at the amateur levels of ice hockey are not known, it is thought to be a fairly common occurrence. A hockey study from Canada surveying players throughout all professional levels in the sport demonstrated that at least sixty percent of the players suffered at least one concussion in their career. From Oct. 1, 2001 through Dec. 31, 2001, there were sixty-seven concussions in the National Hockey League. The total number of concussions in the National Hockey League exceeds one hundred per year for a league that has six hundred players.

The governing bodies at every level of amateur and profession ice hockey mandate the use of helmets. Typically, helmets comprise a rigid outer shell and an energy absorbing liner. The helmet shell functions to: (i) maintain the energy absorbing liner in position upon impact, (ii) prevent penetration of sharp objects, and (iii) dissipate the impact's energy prior to it reaching the energy absorbing liner.

Energy absorbing liners and padding are made from either open-cell foam or closed-cell foam. Energy absorbing liners and padding compress as they absorb energy. The purpose of the energy absorbing liner is to decrease the energy of the impact force. This is called impact attenuation. If an egg were dropped onto an energy absorbing pad, it would either crack or stay whole, based on the amount of energy absorbed by the energy absorbing padding. Open-celled foam will rebound after it is compressed from an impact. Polyvinyl chloride padding or vinyl nitrile padding are types of celled foam commonly used in helmets as an energy absorbing liner. Expanded polystyrene (EPS) is a type of closed-cell foam that is the most commonly energy absorbing liner used today in sporting helmets. EPS is a type of STYROFOAM used for packaging protection. EPS is compressed and crushed as it absorbs energy. While EPS attenuates impact force well and is considered the "gold standard" in the helmet market, impacts produce permanent damage to the EPS material. Minor impacts to the helmet shell cause microscopic cracks in the EPS, which can seriously destroy its impact attenuation performance.

Most urethane foams are elastic in that the foam deflects under a load, and return a force to the load that is equal to the deflection of the elastic material multiplied by its stiffness. When pressure is applied to common urethane foam, like a spring, the foam deflects and returns a force that is proportional to the amount of deflection. Areas of greatest deflection (i.e., greatest pressure) receive the greatest return force. These pressure hot spots can restrict blood circulation to portions of the body.

Viscoelastic foams have both viscous and elastic response properties. The viscous response property evenly distributes a load, and the elastic response property allows the foam to support a static load. "Viscous" refers to a fluid response that flows away from the applied load or applied force, in that the fluid redistributes the applied load or applied force. Viscoelastic materials redistribute the applied load or applied force away from the point of contact.

Slow recovery viscoelastic polyurethane foam molds, shapes, and adjusts to the surface it is in contact with the application of heat. In athletic headgear, for example, the athlete's head causes the application of heat to the slow recovery viscoelastic polyurethane foam. CONFOR foam displays this characteristic greater than other viscoelastic polyurethane foams. Typically, athletic headgear comprises an outer shell and an inner energy absorbing liner for absorbing impacts suffered during the course of an athletic contest. An energy absorbing liner comprising viscoelastic polyurethane foam absorbs energy transferred from the outer shell, if the head represents the final transfer point of the impact energy. Naturally, the viscoelastic polyurethane foam should absorb as much impact energy as possible prior to being completely compressed. Of course, the greater the surface area of the viscoelastic polyurethane foam contacting the skull, the greater the energy dissipation and absorption there will be prior to the viscoelastic polyurethane foam reaching maximum compression (bottoming out). The viscoelastic polyurethane foam should return to its pre-impact shape after the impact.

Preferred foams would be CONFOR foam by E-A-R Specialty Composites, a division of Cabot Safety Corporation, preferably the stiffer grades such as green or blue would be used for protection of high impact regions but lower densities such as yellow and pink could be used for appropriate uses. Other preferred foams are the Sunmate brand foam from Dynamic Systems, Inc. and Tempur brand foams from Fagerdala World Foams of Sweden.

SUMMARY OF THE INVENTION

The invention has been made in view of the above circumstances and to overcome the above problems and limitations of the prior art, and provides an energy absorbing unit comprising a coating and a foam layer, wherein the coating comprises a isocyanate or a diisocyanate monomer and a polyol and/or polyurethane with chain extended and/or diamines.

Additional aspects and advantages of the invention will be set forth in part in the description that follows and in part will be obvious from the description, or can be learned by practice of the invention. The aspects and advantages of the invention can be realized and attained by means of the instrumentalities and combinations particularly pointed out in the appended claims.

An aspect of the present invention provides an energy absorbing unit having a viscoelastic polyurethane foam layer, wherein the viscoelastic polyurethane foam is slow recovery viscoelastic polyurethane foam, open cell viscoelastic polyurethane foam, closed cell viscoelastic polyurethane foam, or a combination thereof.

In another aspect of the present invention, the diisocyanate monomer is selected from a group consisting of toluene diisocyanate, methyl diphenyl dissocyanate, hexamethylene dissocyanate, isophorone diisocyanate, tetramethylxylylene diisocyanate, dicyclohexylmethane 4,4-diisocyanate, xylylene diisocyanate, dimerized diisocyanate, and paraphenylene diisocyanate.

In another aspect of the invention, the isocyanate monomer is a monocarboxylic polyol or a polycarboxylic polyol. The polyol is selected from a group consisting of polyether polyol, polyester polyol, polycaprolactone polyol, polybutadiene polyol, polycarbonate polyol, sebaceous polyol, epoxy polyol graft copolymer polyol, acrylic polyol, and polyvinyl chloride polyol.

In another aspect of the invention, the coating is produced by reacting a isocyanate or diisocyanate monomer with a polyol to form a prepolymer. The isocyanate or diisocyanate monomer can be crosslinked with the polyol. The prepolymer with a polyol, the polyol having at least one pendant carboxylic acid group, to form a prepolymer with a pendant carboxylic acid group. The pendant carboxylic acid group is neutralized with a tertiary amine, and the result is reacted with water or an organic or inorganic polyamine. The diisocyanate monomer is selected from a group consisting of toluene diisocyanate, methyl diphenyl dissocyanate, hexamethylene dissocyanate, isophorone diisocyanate, tetramethylxylylene diisocyanate, dicyclohexylmethane 4,4-diisocyanate, xylylene diisocyanate, dimerized diisocyanate, and paraphenylene diisocyanate.

In another aspect of the invention, the tertiary amine is selected from a group consisting of tirethylamine, diethylamine, aminomethylpropanol and dimethyethylamine.

In another aspect of the invention, the organic or inorganic polyamine is aliphatic, aromatic, cycloaliphatic, or polyoxypropyleneamines.

In another aspect of the invention, the cross-linked coating has an acid number approximately between 0-100, or has a glass transition temperature of about −100° C. to 0° C.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

Figure 1:
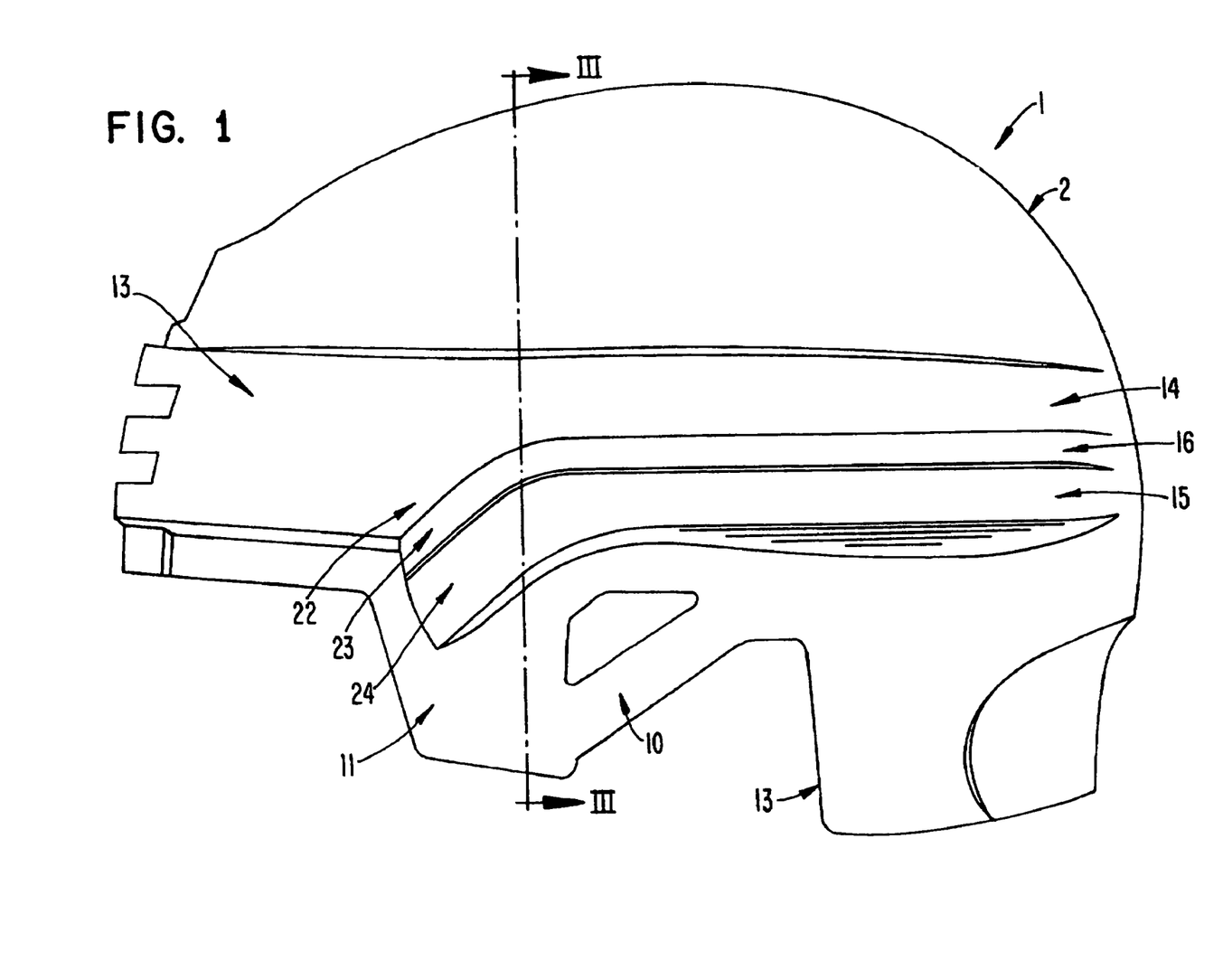
FIG. 1 depicts a side view of a helmet.
Figure 2:
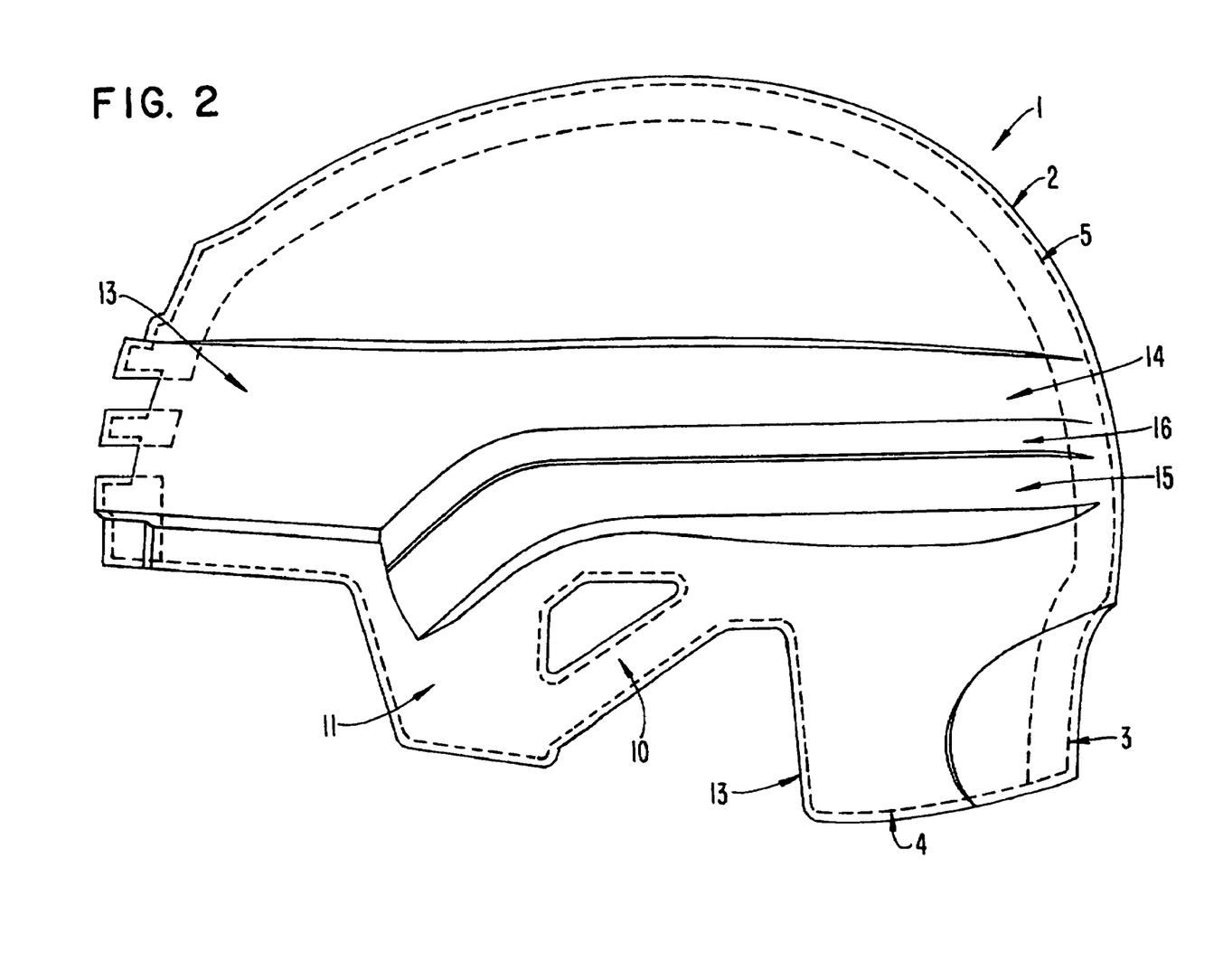
FIG. 2 depicts a side view of a helmet.
Figure 3:
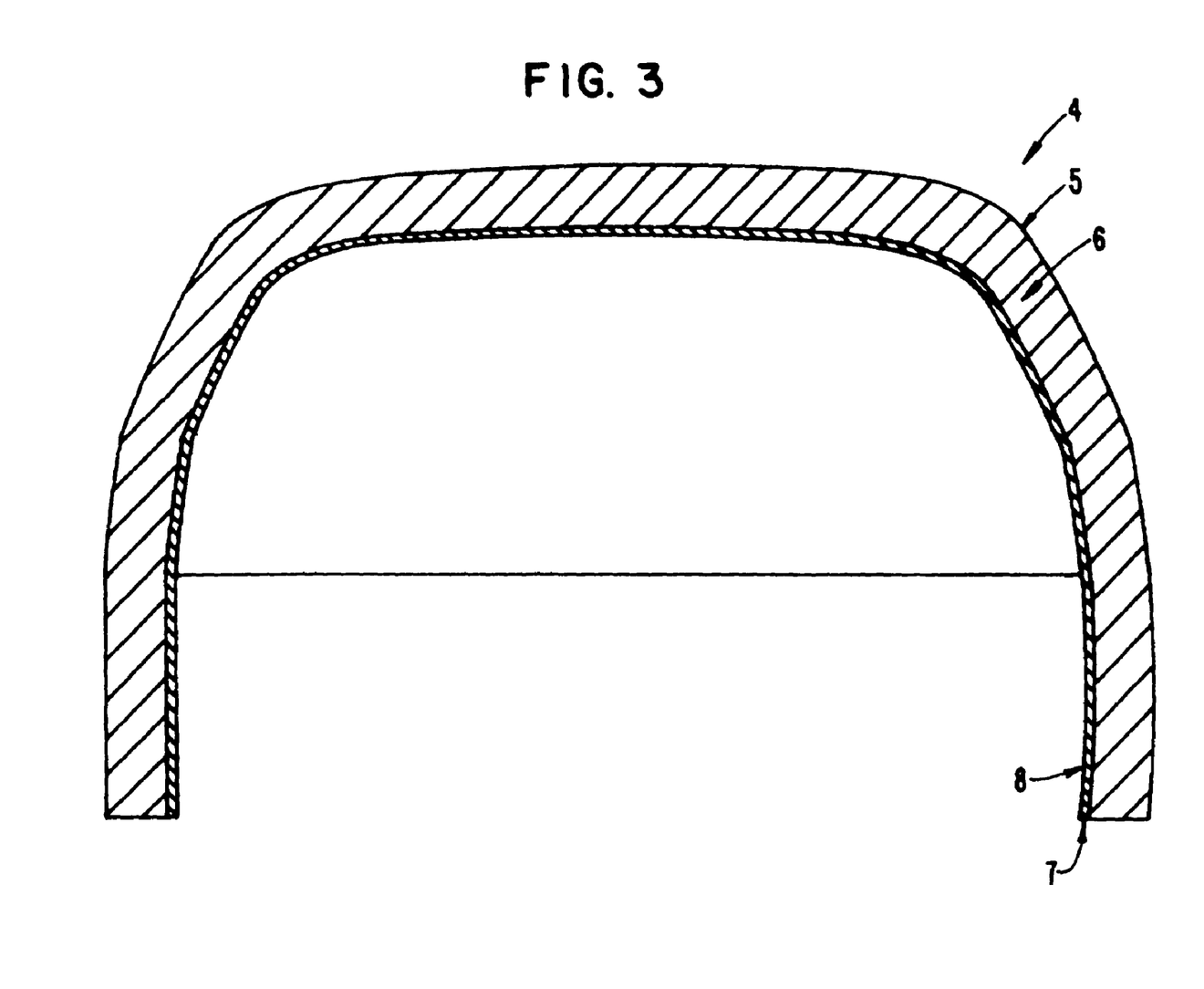
FIG. 3 depicts a rear cross sectional view of an energy absorbing protective liner along line III-III shown in FIG. 1.
Figure 4:
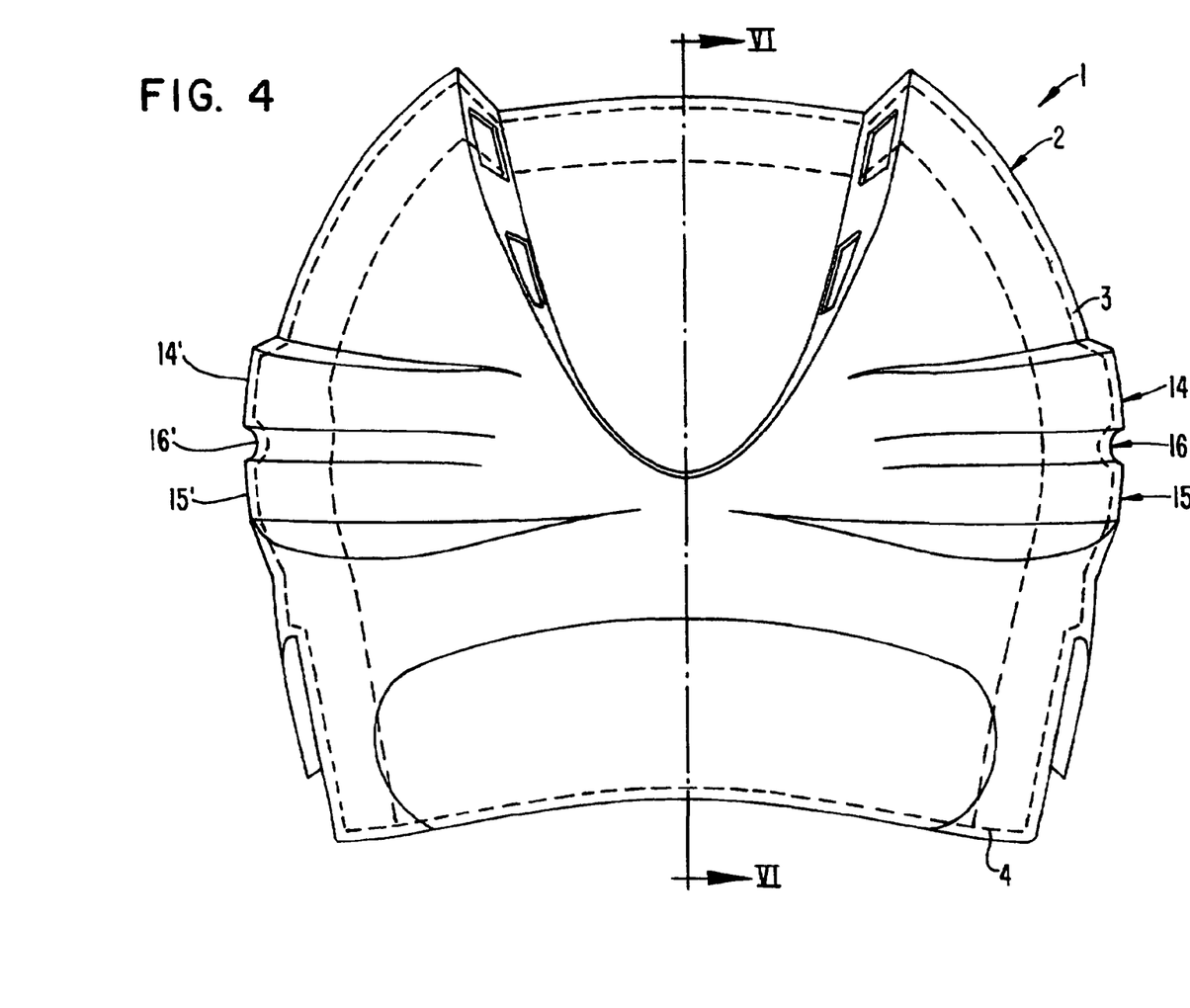
FIG. 4 depicts a rear view of a helmet according to a preferred embodiment of the present invention.
Figure 5:
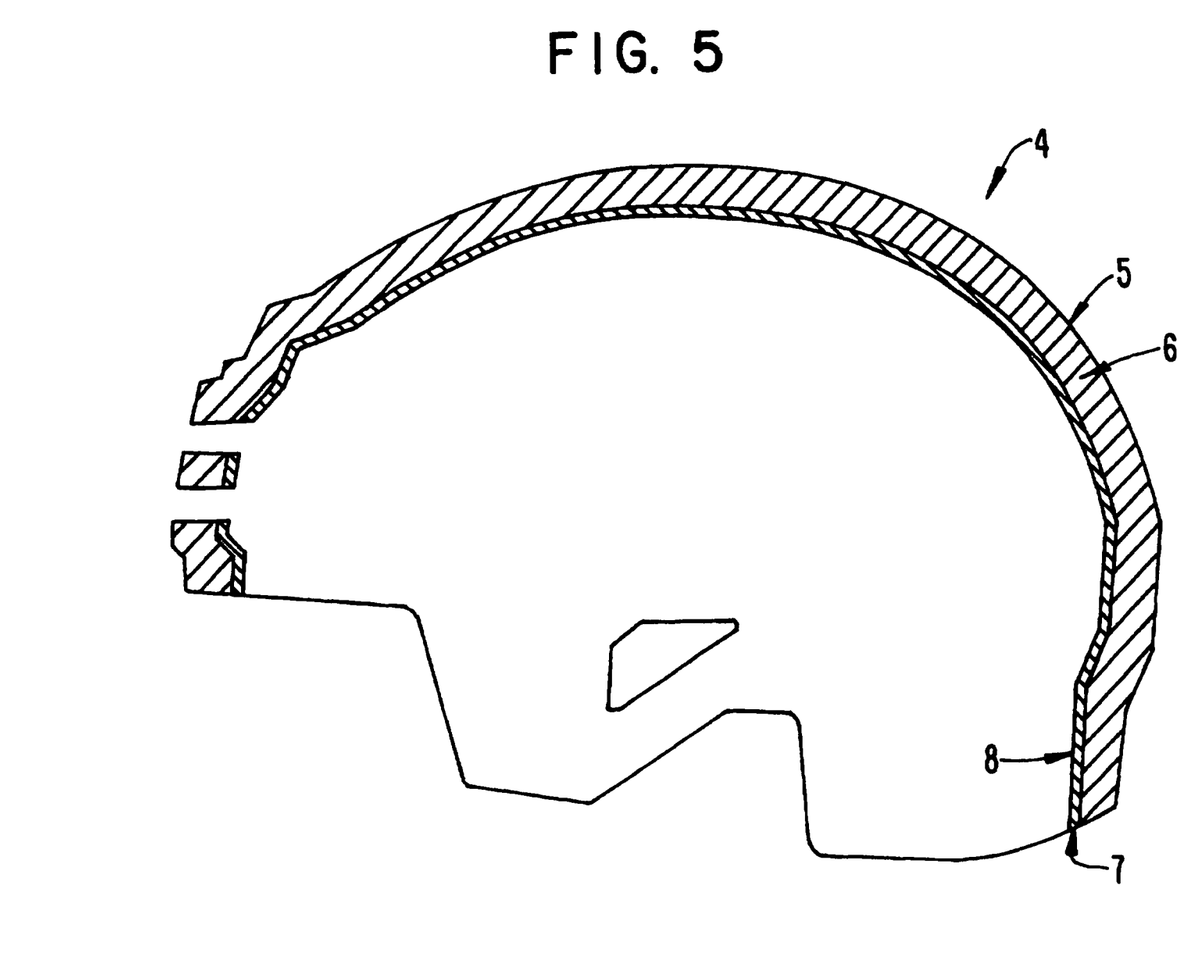
FIG. 5 depicts a side cross sectional view of an energy absorbing protective liner along line VI-VI shown in FIG. 4.

Referring to FIG. 5, a side sectional view of the energy absorbing liner is illustrated, and the layering of the coating 7 on the interior of the energy absorbing liner is shown. In a preferred embodiment, the coating 7 is bonded to the interior surface of the foam layer 6. Preferably, the foam layer 6 is viscoelastic polyurethane foam, and more preferably, the viscoelastic polyurethane foam is CONFOR foam. The coating 7 penetrates into the open cell lattice network of the viscoelastic polyurethane foam layer 6. The coating 7 is cured at room temperature, since heating the viscoelastic polyurethane foam layer 6 will degenerate the structure of the viscoelastic polyurethane foam layer 6. A primer coat (not shown) can be applied to the interior surface of the foam layer 6 to enhance the adherence of the coating 7. The coating 7 can be applied as a 1-part compound or as a 2-part compound (or more than 2 parts if that becomes available). Pigment can be added to the coating 7 for cosmetic reasons.

More specifically, the coating 7 may comprise of any blends of acrylics, styrenated acrylics, acrylamides or acrylonitriles. The coating 7 is made of part A that is either an isocyanate monomer or a diisocyanate monomer. The isocyanate could comprise toluene diisocyanate, methyl diphenyl diisocyanate, hexamethylene diisocyanate, isophorone diisocyanate, tetramethylxylylene diisocyanate, dicyclohexylmethane 4,4 diisocyanate, xylylene diisocyanate, dimerized diisocyanate and paraphenylene diisocyanate. The isocyanate can also comprise monocarboxylic polyol or polycarboxylic polyol. Part A is cross-linked with Part B, and Part B can be either a polyether polyol, polyester polyol, polycaprolactone polyol, polybutadiene polyol, polycarbonate polyol, sebaceous polyol, epoxy polyol, graft copolymer polyol and acrylic polyols. Part B can comprise an acrylic polyol in conjunction with any diamine, and the diamines can be either aliphatic, aromatic, cycloaliphatic or polyoxypropylene amine, or any material with more than one function group or more than one hydroxyl group per molecule. The coating 7 has a carboxylic acid functionality and will have an acid number between 0-100, and has a glass transition temperature of between −100° C. to 0° C. The coating 7 is neutralized with any tertiary amine, triethylamine, diethylamine, aminomethylpropanol or dimethylethylamine.

The coating 7 can be applied to only one surface or more than one surface of the foam layer 6. Applying the coating 7 to a surface of the foam layer 6 prevents airflow through that surface. Application of coating 7 to more than one surface will affect airflow through the foam layer 6 and its compression characteristics. Typically, open cell polyurethane foams have a Young's modulus in the order of 20 kilopascals due to the flow of air. Closed cell foam traps air and has a Young's modulus of approximately 100 kilopascals. This is discussed further in N. J. Mills, *Micromechanics of Polymeric Foams*, which is herein incorporated by reference. In addition, the coating 7 can affect the flow recovery properties of the foam layer 6. The coating 7 on the foam layer 6 decreases the amount of time required for the foam layer 6 to return to its original volume after it has been deformed, e.g., by a sudden impact. The protection afforded by the foam layer 6 is at its maximum when the foam layer 6 occupies its original volume, and is not deformed. For example, if an uncoated foam layer 6 rebounds to its original shape in three seconds, a coated foam layer will rebound to its original shape is much less time. This characteristic provides addition protection for body parts that are subjected to successive impacts, in that a coated foam layer will have the ability to rebound much more quickly to provide impact protection.

A full coating 7 is applied over the surface of the foam layer 6 that will be in contact with the athlete's head.

The coating 7 has multiple functions: it prevents water absorption by the foam layer 6. The foam layer 6 has a microscopic structure similar to that of the sponge and easily absorbs water. Uncoated open cell polyurethane foam can absorbed many times their weight in water. Water absorbed by open cell polyurethane foam adds to the weight of the open cell polyurethane foam. The water typically absorbed by the open cell polyurethane foam is that produced by the athlete during sweating. Any added weight in open cell polyurethane foam padding increases in the inertia of the head during athletic activities and decrease the effectiveness of the head protection. Therefore, to maximize the protectiveness of the energy absorbing liner insert 4, it is important to eliminate the absorption of water.

The coating 7 maintains the sanitation of the energy absorbing liner insert 4. Sweating produces water, which is absorbed by uncoated open cell polyurethane foam. Athletic activities in warmer environments typically produce a great deal of sweat, unlike sports such as skiing and snowboarding where the athlete might not produce as much sweat in the helmet. The water from sweating and the contact from the athlete's skin can promote the proliferation of bacteria. Bacteria produce odors and can promote skin infections (e.g., folliculitis). Helmets are typically stored in dark or confined areas (e.g., athletic bags) that can further promote bacterial production. The coating 7 coated on the foam layer 6 minimizes bacterial growth and enhances a sanitized helmet.

Viscoelastic open cell polyurethane foam has a tendency to degenerate with friction. This is commonly seen when using this type of foam for padding in a sports helmet. The friction causes a fine granular layer of foam to wear off from the foam padding, usually ending up in the athlete's hair or on the athlete's skin. Bonding the coating 7 to the surface of the foam layer 6 that will be in contact with the athlete's skin prevents this degeneration. In addition, the coating can enhance the surface tear strength of the viscoelastic foam.

In a preferred embodiment, the foam layer 6 is viscoelastic polyurethane foam of variable thickness and size for a helmet or protective athletic equipment used for impact attenuation. The viscoelastic polyurethane foam layer 6 has a unique characteristic in that warming easily deforms it, and thus it conforms to shape of the athlete's head or body part when applied. The application of the coating 7 does not interfere with this characteristic.

There is typically a limitation in the number of differently sized helmet shells available to the athlete. To maximize the protection afforded to the athlete, the helmet shell should have a custom fit to the athlete's head. The helmet should fit snugly and the padding should have intimate contact with the surface of the head throughout all areas of the helmet shell.

In a preferred embodiment, the thickness and size of the viscoelastic polyurethane foam layer 6 will vary in order to custom size a helmet 1 to each athlete. Within the helmet shell 2, as much viscoelastic polyurethane foam layer 6 as possible be present within the helmet shell 2 in order to maximize the energy absorption in an impact. Thus, an athlete could use the same helmet shell 2 with several differently sized energy absorbing liner inserts 4. The size and thickness of each energy absorbing liner inserts 4 would be based on the interior size of the helmet shell 2 and the size of the athlete's head. In the case of a growing young athlete, as the size and shape of the athlete's head changed, a new energy absorbing liner insert 4 could be fitted to the athlete's head, thereby insuring a snug fit for maximum protection.

Alternatively, instead of a unitary energy absorbing liner insert 4, individual pads spaced within the helmet shell 2 can comprise the energy absorbing liner insert 4. Preferably, the individual pads would be viscoelastic polyurethane foam. The individual pads are arrayed within the helmet shell 2 with minimal distance between them in order to maximize energy absorption. Individual pads could also be used for other protective body armour elements such as gloves, elbow pads, shoulder pads, thoracic protection, hip and thigh protection, leg protection and pads for inside footwear, boots or skates.

Figure 6:
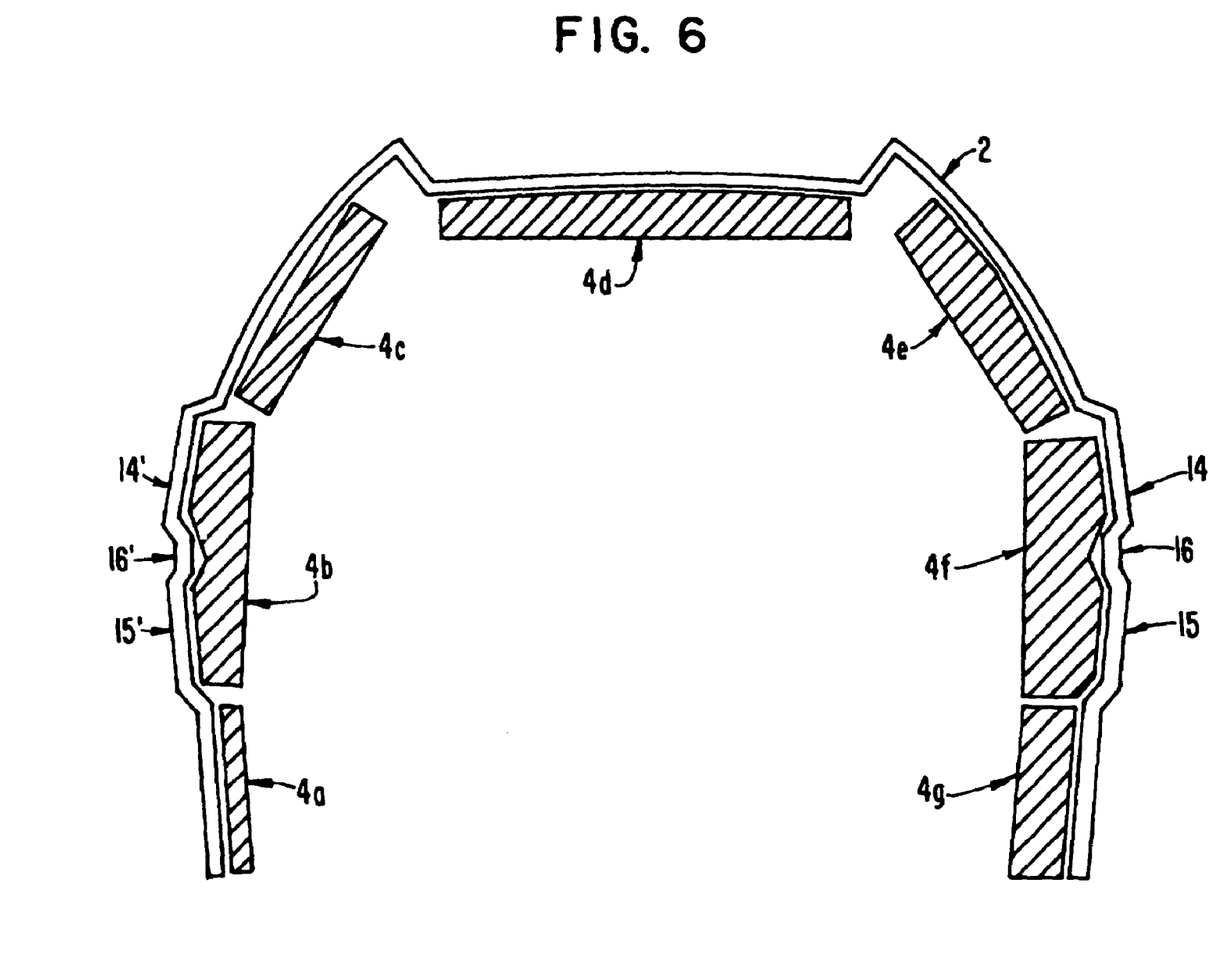
FIG. 6 depicts a rear cross sectional view of individual energy absorbing protective liner pads along line III-III shown in FIG. 1.

Referring to FIG. 6, an embodiment of a helmet shell 2 with multiple helmet pads 4a-4g is illustrated. For the sake of clarity, each of the pads is shown without the coating 7. Each of the helmet pads 4a-4g has a different thickness in order to illustrate how helmet pads of different thickness can be used to achieve a snug fit. For example, the helmet pad 4a is not as thick as the helmet pad 4g. Typically, each of these helmet pads would be the same thickness. However, if the helmet shell 2 is loose in that particular region, the thickness of one or more of the helmet pads can be increased to tighten the fit of the helmet shell 2. Similarly, helmet pads 4c-4e (in various thicknesses) can be used to adjust the height of the helmet shell 2 with respect to the athlete's head.

The viscoelastic polyurethane foam layer 6 has a unique characteristic in that warming easily deforms it, and thus it conforms to shape of the athlete's head when applied. The application of the coating 7 does not interfere with this characteristic. A liquid water-borne polyurethane and/or polyurea polymer coating that is applied to a polyurethane and/or polyurea foam padding.

The invention claimed is:

1. A method for making an elastomeric polyurethane or polyurea coated viscoelastic polyurethane foam, the method comprising:
    applying to an uncoated viscoelastic polyurethane foam a water-borne elastomeric polyurethane or polyurea coating produced by:
    reacting a diisocyanate monomer selected from the group consisting of tetramethylxylylene diisocyanate, dicyclohexylmethane -4,4-diisocyanate, isophorone diisocyanate, and toluene diisocyanate with a polyol selected from the group consisting of polyether polyol and polyester polyol to form a prepolymer,
    reacting the prepolymer with a polyol, the polyol having at least one pendant carboxylic acid group, to form a prepolymer with a pendant carboxylic acid group,
    neutralizing the pendant carboxylic acid group with a tertiary amine selected from the group consisting of triethylamine, diethylamine, aminomethylpropanol, and dimethylethylamine, and then reacting the result with water or an organic or inorganic polyamine;
    and
    allowing the water-borne coating to cure, thereby creating a coated viscoelastic foam;
    wherein the coated viscoelastic polyurethane foam returns to its original volume after it has been deformed in a shorter amount of time than the amount of time required for the uncoated viscoelastic polyurethane foam to return to its original volume after it has been deformed.

2. The method as claimed in claim 1, wherein the elastomeric coating is an elastomeric polyurea coating.

3. The method of claim 1 wherein the water-borne elastomeric polyurethane or polyurea coating is applied to the viscoelastic polyurethane foam by spraying, painting, dipping, flowcoating, or rollercoating.

4. The method of claim 1 wherein the elastomeric coating is an elastomeric polyurethane coating.

5. An energy absorbing unit comprising an elastomeric coating on a foam layer:
   wherein the coating comprises a cured water-borne polyurethane or polyurea coating produced by:
   reacting a diisocyanate monomer selected from the group consisting of tetramethylxylylene diisocyanate, dicyclohexylmethane-4,4-diisocyanate, isophorone diisocyanate, and toluene diisocyanate with a polyol selected from the group consisting of polyether polyol and polyester polyol to form a prepolymer,
   reacting the prepolymer with a polyol, the polyol having at least one pendant carboxylic acid group, to form a prepolymer with a pendant carboxylic acid group,
   neutralizing the pendant carboxylic acid group with a tertiary amine selected from the group consisting of triethylamine, diethylamine, aminomethylpropanol, and dimethylethylamine, and then reacting the result with water or an organic or inorganic polyamine;
   wherein the foam layer is a viscoelastic polyurethane foam; and
   wherein the viscoelastic polyurethane foam more quickly returns to its original volume after being deformed when the elastomeric coating is present on the viscoelastic polyurethane foam.

6. The energy absorbing unit as claimed in claim 5, wherein the viscoelastic polyurethane foam is slow recovery viscoelastic polyurethane foam, open cell viscoelastic polyurethane foam, closed cell viscoelastic polyurethane foam, or a combination thereof.

7. The energy absorbing unit as claimed in claim 5, wherein the elastomeric coating is an elastomeric polyurethane coating.

8. The energy absorbing unit as claimed in claim 5, wherein the elastomeric coating is an elastomeric polyurea coating.

9. The energy absorbing unit as claimed in claim 5 wherein the water-borne elastomeric polyurethane or polyurea coating is applied to the viscoelastic polyurethane foam by spraying, painting, dipping, flowcoating, or rollercoating.

10. A protective element for a part of the human body comprising at least one energy absorbing unit comprising a coating on a foam layer:
    wherein the coating comprises a cured water-borne elastomeric polyurethane or polyurea coating produced by:
    reacting a diisocyanate monomer selected from the group consisting of tetramethylxylylene diisocyanate, dicyclohexylmethane-4,4-diisocyanate, isophorone diisocyanate, and toluene diisocyanate with a polyol selected from the group consisting of polyether polyol and polyester polyol to form a prepolymer,
    reacting the prepolymer with a polyol, the polyol having at least one pendant carboxylic acid group, to form a prepolymer with a pendant carboxylic acid group,
    neutralizing the pendant carboxylic acid group with a tertiary amine selected from the group consisting of triethylamine, diethylamine, aminomethylpropanol, and dimethylethylamine, and then reacting the result with water or an organic or inorganic polyamine;
    wherein the foam layer is a viscoelastic polyurethane foam;
    wherein the coating is present on a surface of the protective element designed to be worn in contact with the human body; and
    wherein the viscoelastic polyurethane foam more quickly returns to its original volume after being deformed when the elastomeric coating is present on the viscoelastic polyurethane foam.

11. The protective element as claimed in claim 10 wherein the water-borne elastomeric polyurethane or polyurea coating is applied to the viscoelastic polyurethane foam by spraying, painting, dipping, flowcoating, or rollercoating.

12. The protective element as claimed in claim 10, wherein the protective element is a helmet.

* * * * *